(12) United States Patent
Hayes

(10) Patent No.: US 9,758,985 B2
(45) Date of Patent: Sep. 12, 2017

(54) ELEVATED HUNTING BLIND

(71) Applicant: ARDENT CONCEPTUAL DESIGN, LTD., Sherman, TX (US)

(72) Inventor: Clint A. Hayes, Denison, TX (US)

(73) Assignee: ARDENT CONCEPTUAL DESIGN, LTD., Sherman, TX (US)

( * ) Notice: Subject to any disclaimer, the term of this patent is extended or adjusted under 35 U.S.C. 154(b) by 0 days.

(21) Appl. No.: 14/853,456

(22) Filed: Sep. 14, 2015

(65) Prior Publication Data

US 2016/0083972 A1  Mar. 24, 2016

Related U.S. Application Data

(63) Continuation of application No. 12/689,124, filed on Jan. 18, 2010.

(60) Provisional application No. 61/145,386, filed on Jan. 16, 2009.

(51) Int. Cl.
*E04H 15/00* (2006.01)
*A01M 31/02* (2006.01)

(52) U.S. Cl.
CPC ......... *E04H 15/001* (2013.01); *A01M 31/025* (2013.01)

(58) Field of Classification Search
CPC ... E04H 1/1205; E04H 1/1216; E04H 1/1244; E04H 15/001; A01M 31/025
USPC ............. 135/87, 100, 90, 901; 43/1; 52/36.2
See application file for complete search history.

(56) References Cited

U.S. PATENT DOCUMENTS

| | | | |
|---|---|---|---|
| 3,116,808 A | 1/1964 | Riley | |
| 3,513,605 A * | 5/1970 | Smith | A01M 31/025 135/901 |
| 3,625,235 A | 12/1971 | Gorgichuk | |
| 4,084,597 A | 4/1978 | Compton | |
| 4,456,272 A * | 6/1984 | Kroeger | B62B 13/00 220/DIG. 13 |
| 4,506,467 A | 3/1985 | Strung | |
| 4,897,972 A * | 2/1990 | Stollery | E04H 1/1205 52/204.1 |
| 4,951,696 A | 8/1990 | Jones, Sr. | |
| 5,102,179 A * | 4/1992 | Royer | A01M 31/025 182/141 |
| 5,142,833 A * | 9/1992 | Svehaug | A01M 31/00 428/919 |
| 5,371,966 A | 12/1994 | Hall | |
| 5,613,512 A | 3/1997 | Bean | |
| 5,862,827 A | 1/1999 | Howze | |

(Continued)

*Primary Examiner* — Noah Chandler Hawk

(57) ABSTRACT

The present disclosure provides a hunting blind. The hunting blind, in one embodiment, includes a base comprised of a metal exterior with metal support crossbars configured to support the weight of a human and be elevated above ground level using three or more separate legs. The hunting blind, in this embodiment, includes one or more sidewalls coupleable to the base, at least one of the one or more sidewalls including a first rigid substantially vertical portion and a second rigid portion extending up and slanting outwardly from the first substantially vertical portion by at least about 10 degrees. The hunting blind, in this embodiment, further includes one or more fixed outwardly slanting windows located within the second rigid portion, the one or more outwardly slanting windows have a surface area less than a surface area of the second rigid portion, and a rigid roof coupled to the second portion.

14 Claims, 8 Drawing Sheets

(56) References Cited

U.S. PATENT DOCUMENTS

| | | |
|---|---|---|
| 6,202,665 B1 | 3/2001 | O'Hare |
| 6,431,192 B2 | 8/2002 | O'Hare |
| 6,539,966 B2 | 4/2003 | Raines, Jr. et al. |
| 6,941,961 B1 | 9/2005 | Eastman, II |
| 6,942,065 B1 | 9/2005 | Price |
| 7,121,290 B2 | 10/2006 | Eastman, II |
| 7,182,091 B2 | 2/2007 | Maddox |
| 7,246,630 B1 | 7/2007 | Ransom et al. |
| 8,756,872 B2 * | 6/2014 | Preg .................... A01M 31/025 135/901 |
| 8,966,831 B1 * | 3/2015 | Stoll ................... A01M 31/025 403/335 |
| 9,247,727 B2 * | 2/2016 | Peterson ............. A01M 31/025 |
| 2005/0279394 A1 | 12/2005 | Leininger et al. |
| 2007/0175109 A1 * | 8/2007 | Stollery ................. E04B 7/163 52/81.5 |

\* cited by examiner

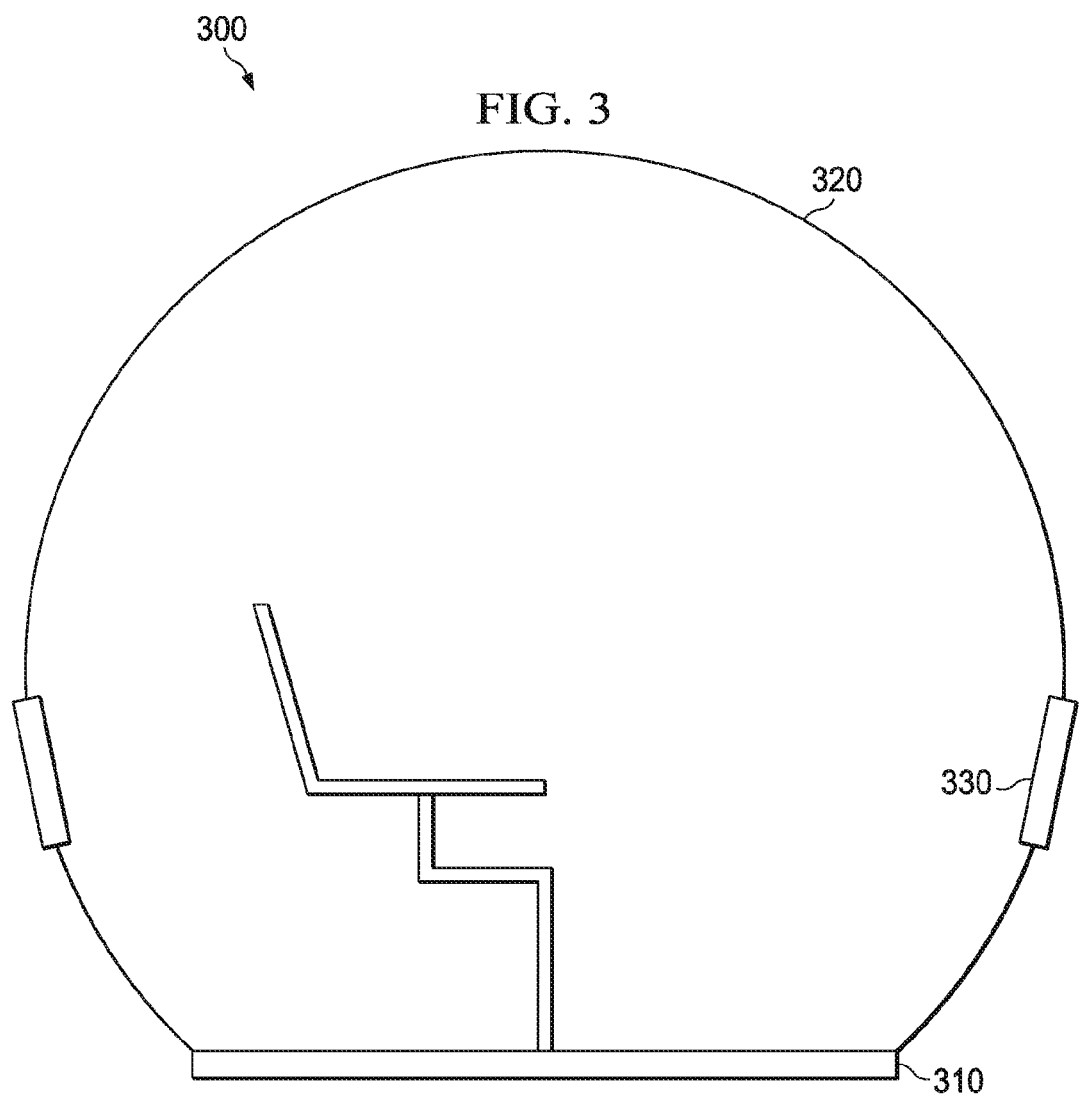

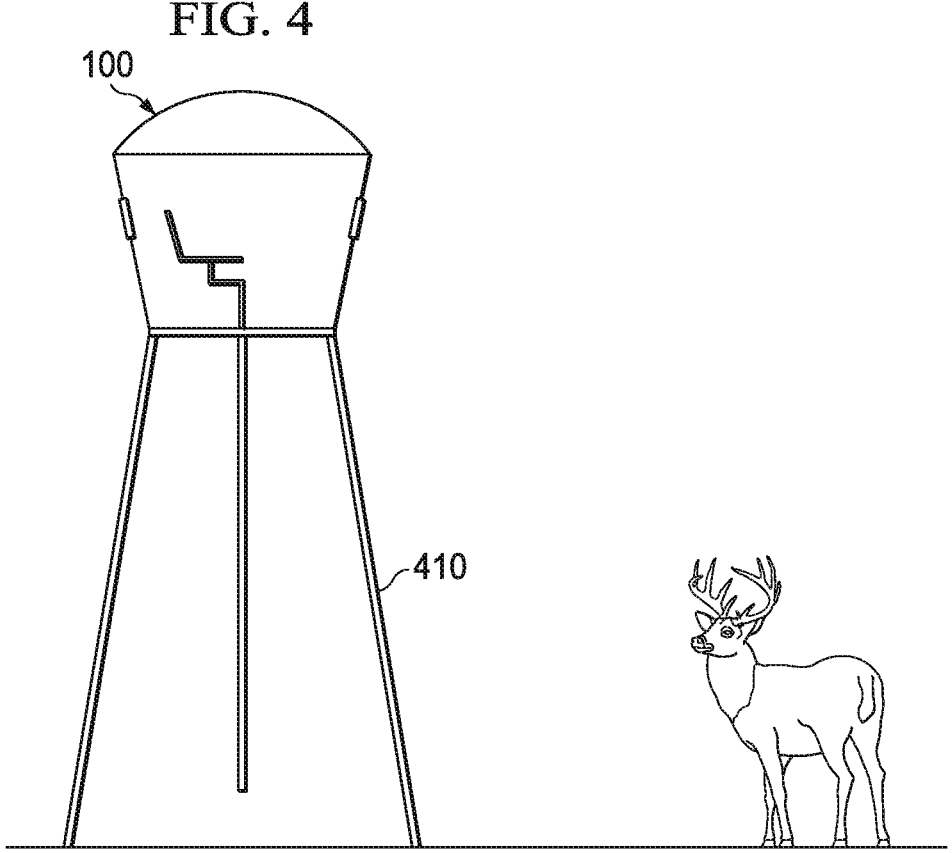

ELEVATED HUNTING BLIND

CROSS-REFERENCE TO RELATED APPLICATION

This application is a continuation of U.S. patent application Ser. No. 12/689,124 entitled "Elevated Hunting Blind", filed on Jan. 18, 2010 which claims the benefit of U.S. Provisional Application Ser. No. 61/145,386 entitled "Covered Elevated Archery Hunting Blind" to Clint A. Hayes, filed on Jan. 16, 2009, both are commonly assigned with the present disclosure and incorporated herein by reference as if reproduced herein in its entirety.

TECHNICAL FIELD

The present disclosure is directed, in general to a hunting blind and more specifically, to an elevated hunting blind.

BACKGROUND

Over the years, various configurations of hunting blinds have developed. Such blinds are conventionally used either on the ground or often as elevated stands. Most often, these blinds are attached in some manner to an elevated structure (e.g., a selected tree or post) and provide some type of frame work to which a camouflage curtain is attached to prevent detection by the wildlife being hunted.

Such blinds were traditionally used to observe and hunt various different types of wild game with a firearm. However, with the ever increasing popularity of bow and arrow hunting, said blinds have of late been equally used to hunt wild game with a bow. Unfortunately, the traditional blinds were designed with the firearm hunter's needs and desires in mind, including the ability to shoot the wild game at greater distances, as opposed to the bow and arrow hunter's needs and desires in mind, including the need to accommodate shorter distance shots.

Accordingly, what is desired in the art is an elevated hunting blind that addresses the problems experienced by bow and arrow hunters.

SUMMARY

To address the above-discussed deficiencies of the prior art, the present disclosure provides a hunting blind. The hunting blind, in one embodiment, includes a base comprised of a metal exterior with metal support crossbars configured to support the weight of a human and be elevated above ground level using three or more separate legs. The hunting blind, in this embodiment, includes one or more sidewalls coupleable to the base, at least one of the one or more sidewalls including a first rigid substantially vertical portion and a second rigid portion extending up and slanting outwardly from the first substantially vertical portion by at least about 10 degrees. The hunting blind, in this embodiment, further includes one or more fixed outwardly slanting windows located within the second rigid portion, the one or more outwardly slanting windows have a surface area less than a surface area of the second rigid portion, and a rigid roof coupled to the second portion.

BRIEF DESCRIPTION OF THE DRAWINGS

For a more complete understanding of the present disclosure, reference is now made to the following descriptions taken in conjunction with the accompanying drawings, in which:

FIG. 3 illustrates an alternative embodiment of a hunting blind;

FIG. 4 illustrates the hunting blind of FIG. 1, further including an optional and detachable elevating structure coupled to the base structure;

DETAILED DESCRIPTION

Figure 1:
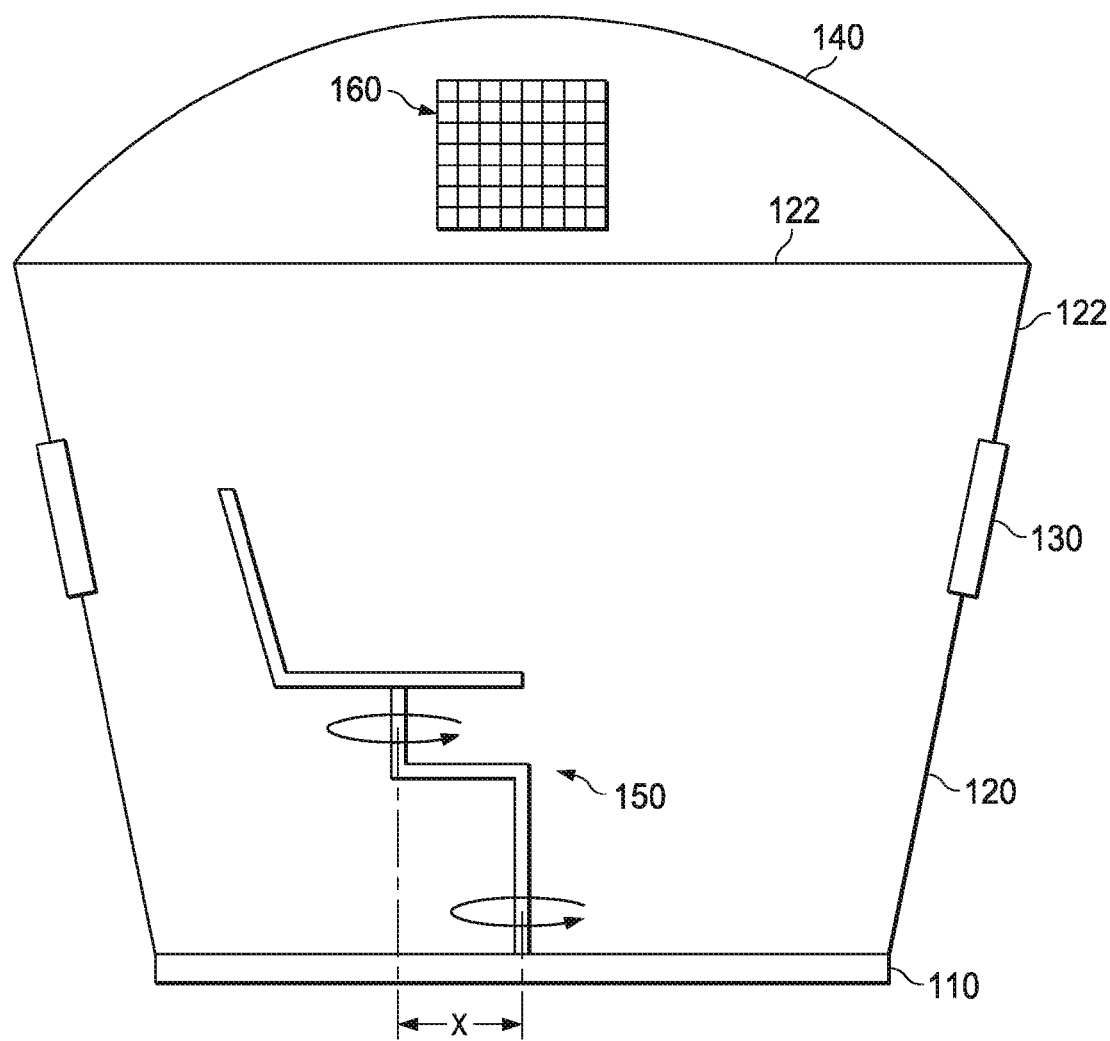
FIG. 1, FIG. 1A and FIG. 1B illustrate a hunting blind manufactured in accordance with this disclosure in a deployed state, a semi collapsed state and a fully collapsed state, respectively.

Referring initially to FIG. 1, illustrated is a hunting blind 100 manufactured in accordance with this disclosure. The term hunting blind, as used herein, refers to structure used to observe, photograph, or hunt animals in an outdoor setting. Accordingly, the term hunting blind should not be limited to only those situations wherein a firearm, bow or cross-bow are being used, but can equally extend to the use for nature observing and photography. Nevertheless, a hunting blind as described herein is particularly useful for hunting wild game, and more particularly useful for hunting wild game with a bow and arrow. It should additionally be noted that the phrase "bow and arrow", as used herein, includes traditional long bows, compound bows, re-curved bows, cross-bows, amongst others.

The hunting blind 100 of FIG. 1 initially includes a base structure 110. The base structure 110, in this embodiment, is configured to support the weight of a human. Accordingly, the base structure 110, in this embodiment, should be of sufficient strength to support hundreds of pounds of weight bearing down thereon. In one embodiment, the base structure 110 is comprised of a metal exterior with metal support crossbars. Likewise, the base structure 110 may have a wood, composite, or metal foot plate, among others, attached to the metal exterior and metal support crossbars. Nevertheless, those skilled in the art understand that other materials, such as wood, fiberglass, polymer, etc. may be used, presuming they provide the requisite strength and support.

The hunting blind 100 of FIG. 1 further includes one or more sidewall structures 120 coupled to the base structure 110. In this embodiment, at least a portion of the one or more sidewall structures 120 are configured to slant outwardly from the base structure 110. Likewise, while one embodiment exists wherein all of the one or more sidewalls slant outwardly, other embodiments exist wherein less than all sidewalls slant outwardly. For example, the one or more sidewall structures 120 of the embodiment of FIG. 1 are configured to markedly slant outward from the base structure 110, so as to facilitate the uninhibited shooting of a bow and arrow, firearm, camera, etc., no matter the distance or proximity of the relevant animal to the blind. This includes those situations wherein the animal is quite close to the base of the blind. Accordingly, in one embodiment the one or more sidewall structures 120 slant outward from the base structure 110 by at least 10 degrees. In yet another embodiment, the one or more sidewall structures 120 slant outward from the base structure 110 by at least 30 degrees, and in yet another embodiment the one or more sidewall structures 120 slant outward from the base structure 110 by up to about 60 degrees. It should be noted that the greater the degree of slant of the one or more sidewall structures 120, the greater the ability of the human located therein to shoot (e.g., whether with a firearm, a bow and arrow, photography equipment) an animal near the base of the hunting blind 100.

Figure 1A:
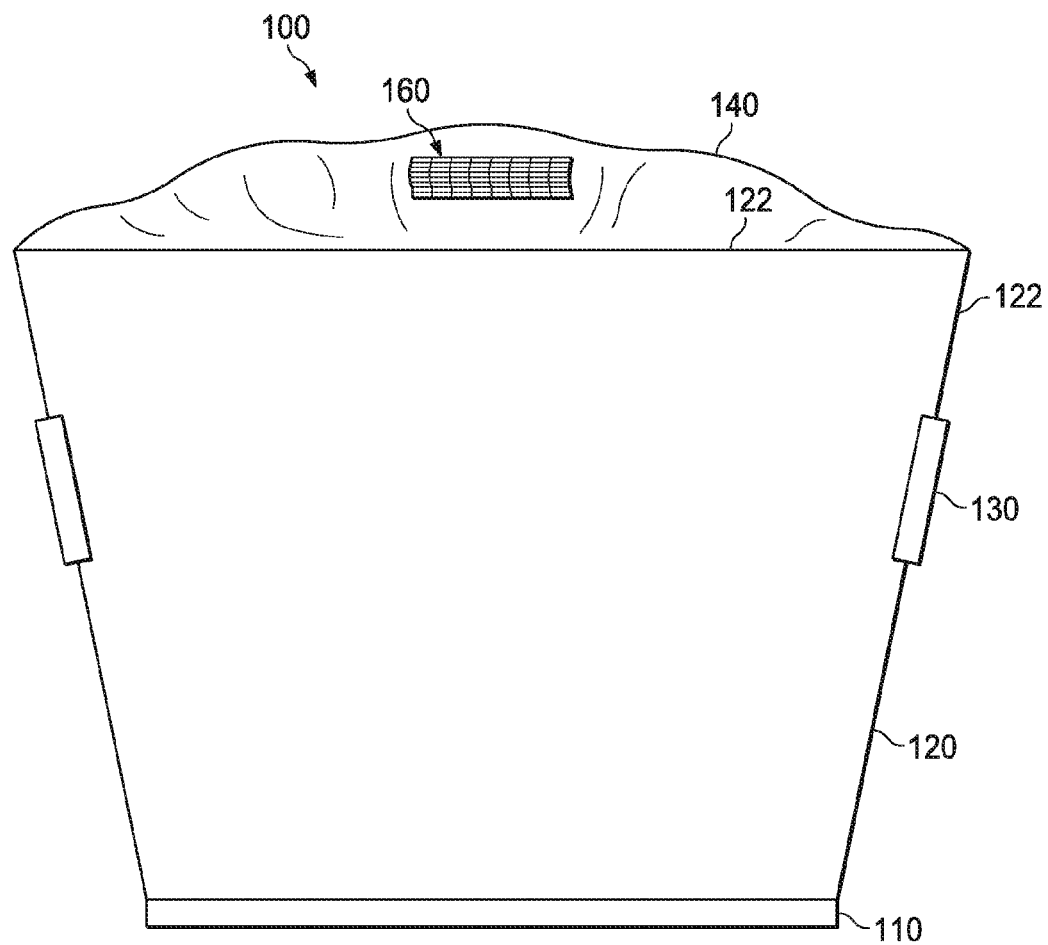
Figure 1B:
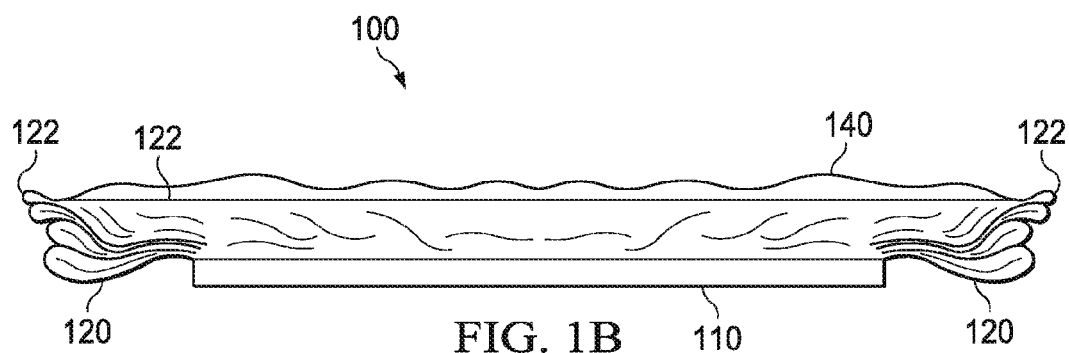

The one or more sidewall structures 120 may comprise either a rigid material, such as metal, wood, polymer, etc. or alternatively may comprise a non rigid material (e.g., conforming material) such as fabric, plastic, etc. In those instances wherein the hunting blind 100 is a stationary structure exposed to the elements of the wild for extended periods of time, it could be best that the one or more sidewall structures 120 comprise the more rigid and thus more durable materials. However, in those instances wherein the hunting blind 100 is portable, or even collapsible, and thus not exposed to the elements of the wild for extended periods of time, it could be best that the one or more sidewall structures comprise the less rigid materials. In those instances where the non rigid materials are used, it might be necessary for semi-rigid or flexible members to define the shape of the one or more sidewall structures 120. For instance, one embodiment exists wherein fiberglass poles, or alternatively tent poles, are used to define the shape of the one or more sidewall structures 120. In this instance, the one or more sidewall structures 120 could removably attach to the base 110, but be installed in a similar manner as a tent might be installed. Furthermore, the one or more sidewall structures 120 might just pop up and into shape like a pop-up tent. FIGS. 1A and 1B illustrate the hunting blind 100 of FIG. 1 in a semi collapsed state and fully collapsed state, respectively.

Located within the one or more sidewall structures 120 may be one or more windows 130. The windows 130, in this embodiment, are configured for extending an arrow, a gun barrel or photographic equipment therefrom. In the embodiment of FIG. 1, the one or more windows 130 are located in the outwardly slanting portion of the one or more sidewall structures 120. In this embodiment, the slanted sidewall structures 120 cause the windows 130 to be in such geometric arrangement that, while the human can easily see out, typical animals located at ground level have difficulty detecting movement within the interior of the hunting blind 100. More particularly, the geometric arrangement reduces, if not eliminates, silhouetting of the human located therein traditionally caused by the opposing window. To further assist in the reduction of silhouetting, the one or more windows 130 may have adjustable covers that are configured to selectively occlude the window as desired.

The one or more windows 130 may be configured in a number of manners to accomplish the above-described desires. In one embodiment, the one or more windows 130 are configured as a single window surrounding the entire perimeter of the hunting blind 100. Accordingly, the windows 130 provide excellent visibility of the surrounding terrain so that the hunter located therein can observe the animal of interest, regardless of the position of the hunting blind with respect to the animal. In this embodiment, a band of shoot through netting or opaque material could drape over the interior or exterior of the windows, to further prevent silhouetting, while allowing access to the outside of the hunting blind 100. This type of netting may attach to the hunting blind 100 using snaps, Velcro, zippers, magnets, among other fastening means. In yet other embodiments, a plurality of separate windows are positioned at various positions around the exterior of the sidewall structures 120, for example using the adjustable covers discussed above to reduce silhouetting. Likewise, the windows 130 may be configured as a circumferential observation screen with multiple different slots for shooting from.

The hunting blind 100 of FIG. 1 further includes an optional roof structure 140 positioned above the base structure 110. In this embodiment, the one or more sidewall structures 120 are configured to extend between the base structure 110 and the roof structure 140. The optional roof structure 140, similar to the sidewall structures 120, may comprise a variety of materials. Nevertheless, the sidewall structures 120 and roof structure 140, and for that matter the base structure 110, need not all comprise the same material. For example, the roof structure 140 may comprise either a rigid material, such as metal, wood, polymer, etc. or alternatively may comprise a non rigid material such as fabric, plastic, etc. In one advantageous embodiment, the roof structure 140 comprises waterproof and windproof material. The one or more sidewall structures 120 may additionally comprise this waterproof or windproof material.

One embodiment exists wherein the one or more sidewall structures 120 and the roof structure 140 comprise a single integral unit. In this embodiment, the one or more sidewall structures 120 and the roof structure 140 would again act as a tent, for example with or without a base. In either event, the one or more sidewall structures 120 and the roof structure 140 could be deployed in a manner similar to a traditional tent, or could alternatively be deployed in a manner similar to a pop-up tent. In this embodiment, the single unit of the one or more sidewall structures 120 and the roof structure 140 could be quickly deployed on/over the more rigid, but separate, base structure 110. In any such embodiment, attachment features could be used to removably attach the separate base structure 110 to the combined sidewall structures 120 and roof structure 140, when in use. Furthermore, the hunting blind 100 can be configured to adhere to an existing hunting blind or hunting stand, whether it is manufactured by one company or another. Accordingly, in one such embodiment the combined sidewall structures 120 and roof structure 140 would couple directly to an already existing hunting stand or blind. In yet another embodiment, the combined sidewall structures 120 and roof structure 140 would adhere to a tree or post that the already existing hunting stand or blind is using as support, but in doing so would at least partially encompass and employ the already existing hunting stand or blind. For example, in one embodiment wherein an existing hunting stand is attached to a tree, the newly designed hunting blind could attach to the tree a sufficient distance above this existing hunting stand, thereby providing camouflage for the occupant. (See, FIG. 6)

In the embodiment of FIG. 1, the roof structure 140 is domed, thus making the hunting blind 100 substantially conical in shape. The term substantially conical, as used herein, refers to the general shape of the hunting blind 100. For example, the footprint of the base structure 110 might be that of a square, and likewise the footprint of the roof structure 140 might be that of a square, but when the square footprint of the base structure 110 and the square footprint of the roof structure 140 are coupled with the one or more sidewall structures 120, the general overall shape of the hunting blind 100 is conical. Therefore, even if the base structure 110 or roof structure 140 include more than four sides, such as if they were pentagonal, hexagonal, heptagonal, octagonal, circular, oval, etc., the general overall shaped of the hunting blind 100 would be considered conical. In other embodiments, however, the roof structure 140 is peaked, flat, or another configuration.

As is illustrated in FIG. 1, the given geometry of the hunting blind 100 of FIG. 1 provides that an area of a footprint of the base structure 110 is less than an area of a footprint of the roof structure 140. In yet another embodiment, such as shown in FIG. 1, the footprint of the base structure 110 is located below, and within, a footprint of the roof structure 140.

A hunting blind, such as the hunting blind 100 of FIG. 1, may include many different optional features. For example, in the embodiment of FIG. 1, the hunting blind 100 includes a seat 150. The seat 150, in this embodiment, is coupled to the base structure 110. More particularly, the seat 150 is removably coupled proximate a centerpoint of the base structure 110. As shown in FIG. 1, the seat 150 may be configured such that a centerpoint thereof is laterally offset from the centerpoint of the base structure 110. Furthermore, the seat 150 may be configured such that it is rotatably coupled about the centerpoint of the base structure 110 as well as rotatably coupled about the lateral offset. The two degrees of rotation allowed by the disclosed seat 150 is helpful for the human within the hunting blind 100 to keep his or her back proximate the back surface of the hunting blind 100. This allows the user room within the hunting blind 100 to safely prepare and fire a weapon (e.g., a bow and arrow or firearm). It is believed that a lateral offset (x) from about 6 to about 12 inches is optimal. In one embodiment, a chair similar to those frequently used in bass boats is used as the seat 150.

In yet another embodiment, two or more seats 150 are located within the hunting blind 100. In this example, the two or more seats 150 may extend from a single post attached to the base structure 110, or alternatively extend from their own posts located at positions offset from the center point of the base structure 110. The embodiments with two or more seats 150 are particularly useful when multiple family members are located within the blind, or alternatively wherein a guide and a hunter are both located within the stand. Obviously, there are certain situations wherein the hunting blind 100 itself will need to be larger to accommodate multiple humans.

The hunting blind 100 may include additional optional features. For instance, the hunting blind 100 could be equipped with a solar power system 160 with or without related battery. In this example, the solar power system 160 could be used to power a small space heater, a portable computer, a cellular phone, lights within the blind, bug zapper, etc. The hunting blind 100 may further include insulation, whether it be in one or more of the base structure 110, one or more sidewall structures 120, and roof structure 140. Additionally, the hunting blind 100 may be bug proof, specifically mosquito proof, whether it be through screens, netting, zippers or otherwise. The hunting blind 100 may further include storage options, such as a bow hanger or camera arm attached to the support system thereof. In this embodiment, the storage options may be moveable within the hunting blind 100. Additionally, the hunting blind 100 could have an odor-absorbing liner placed within an interior thereof, in an attempt to further isolate the human from the animals. In contrast, the material of the hunting blind 100 can be chosen so as to accept and hold an odor-absorbing spray, crystals or other substance. Moreover, an optional lining material, such as a rubber mat, carpet or other noise dampening material may be positioned on the base structure 110 in an attempt to dampen any noise or vibration created by the user's feet or firearm or bow and arrow. Other options, whether currently known or hereafter discovered, including safety mechanisms for keeping the user of the hunting blind from falling therefrom, could equally be used with the hunting blind 100.

A hunting blind, such as the hunting blind 100 of FIG. 1, provides many benefits over its counterparts. First and foremost, the outwardly slanting sidewalls provide the user of the hunting blind more of an opportunity to view animals proximate the base thereof. Accordingly, in those situations wherein an animal need be proximate to the base of the hunting blind before taking a shot, such is often the case with hunting with a bow and arrow, the user of the hunting blind can easily make said shot. In contrast, were the hunting blind to have vertical walls, or even inwardly slanting walls, the user of the hunting blind would be presented with a much more difficult shot on the proximately located animal. Likewise, the peculiar geometry of the hunting blind, with the outwardly slanting walls, allows the hunting blind to be relatively small, thereby decreasing the overall outline of the blind. Furthermore, the combination of the waterproof/windproof roof structure, sidewall structures and base structure, with the superior seat and bug proof nature, offers significant improvement in terms of comfort to the user. These are important features, in that they allow the user to more comfortably and easily hunt on windy or rainy days, or alternatively during warm weather when insects are present, and to sit in the hunting blind for longer periods of time, thus dramatically increasing his or her odds of success.

Figure 2A:
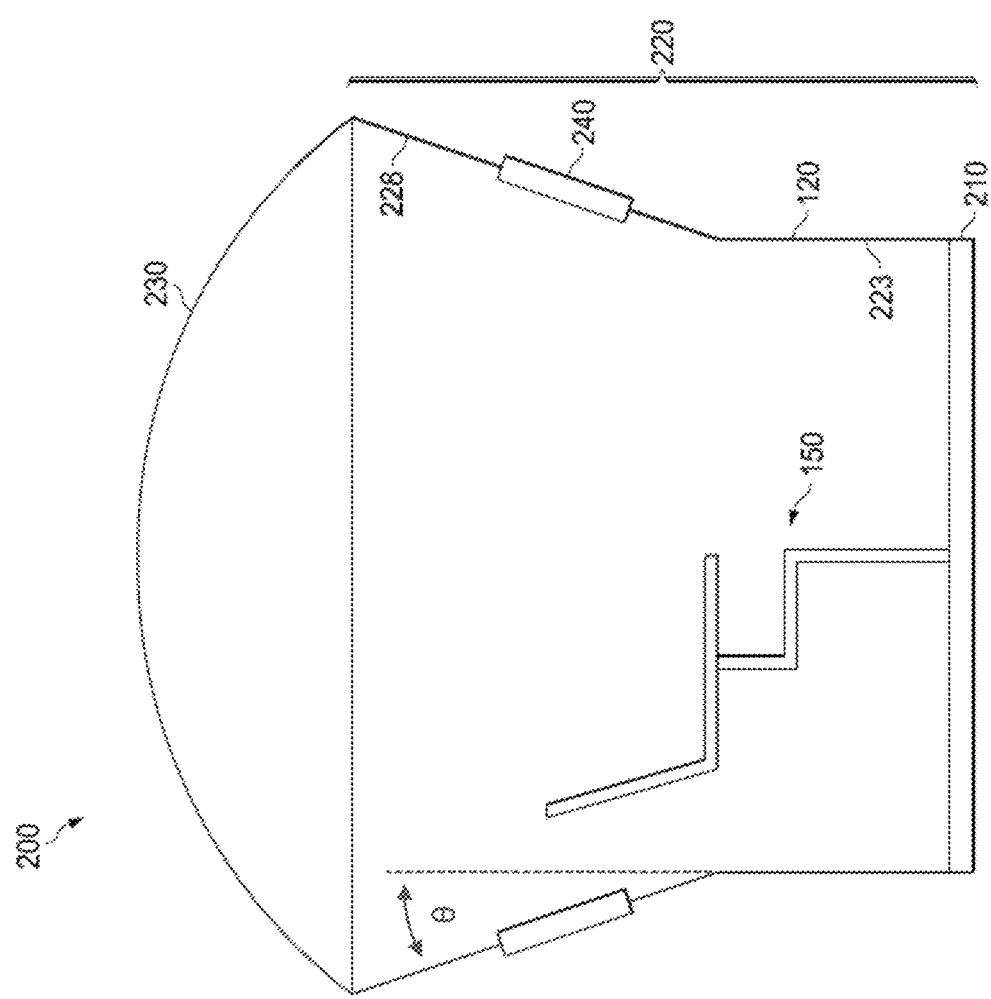
FIG. 2A illustrates an alternative embodiment of a hunting blind.

Turning to FIG. 2A, illustrated is an alternative embodiment of a hunting blind 200. The hunting blind 200 of FIG. 2A includes a base structure 210, one or more sidewall structure 220 and a roof structure 230. The one or more sidewall structures 220 of FIG. 2A, in contrast to the one or more sidewall structures 120 of FIG. 1, however, are not configured to continuously slant outward from the base structure 210. In this embodiment, the one or more sidewall structures 220 include a first portion 223 that is substantially vertical in nature, and further include a second portion 228 that slants outward from the first portion 223. Accordingly, in this embodiment, only a portion of the one or more sidewall structures 220 slants outward, as opposed to the entire portion shown in FIG. 1. Notice, however, in the embodiment of FIG. 2A the one or more windows 240 are still located within the second slanting portion 228.

As shown in FIG. 2A, the second portion 228 slants outward from the first portion 223 by an angle of about $\theta$. Depending on the embodiment, $\theta$ may be at least about 10 degrees, at least about 30 degrees or even at least about 60 degrees. It should be noted that the greater the degree of slant of the one or more sidewall structures 120, the greater the ability of the human located therein to shoot (e.g., whether with a firearm, a bow and arrow, photography equipment) an animal near the base of the hunting blind 100.

Turning to FIG. 3, illustrated is an alternative embodiment of a hunting blind 300. The hunting blind 300 of FIG. 3 includes a base structure 310 and one or more sidewall structure 320. The one or more sidewall structures 320 of FIG. 3 form an enclosure for the hunting blind 300. More specifically, the one or more sidewall structures 320 of FIG. 3 are configured as a bubble. Accordingly, the one or more sidewall structures 320 of FIG. 3 include intentionally curved portions, as opposed to including straight features similar to the embodiments of FIGS. 1 and 2. It should be noted that while the one or more sidewall structures 320 illustrated in FIG. 3 curve entirely over the top of the occupant, thereby forming the roof structure disclosed in other embodiments, such is not always the case. For instance, one embodiment exists wherein the one or more sidewall structures 320 curve to a point above the users head when seated, and then turn to a flat or peaked roof structure, among others.

The hunting blind 300 of FIG. 3 further includes one or more window openings 330. The one or more window openings 330, in accordance with this disclosure, are located within the one or more sidewall structures. Furthermore, at least one of the one or more window openings 330 angles toward ground level. The phrase "angle toward ground level", as used herein, is intended to exclude those instances wherein the one or more window openings 330 are located perpendicular to the ground or angling toward the sky.

Turning to FIG. 4, illustrated is the hunting blind 100 of FIG. 1, further including an optional and detachable elevating structure 410 coupled to the base structure 110. The elevating structure 410, as shown, is configured to elevate the hunting blind 100, or a hunting blind manufactured in accordance with this disclosure, above ground level. As the hunting blind is elevated above ground level, the user thereof has a better vantage point for success. The elevating structure 410, depending on the use thereof, can be configured to elevate the hunting blind 100 up to tens of feet up in the air. The elevating structure 410 of FIG. 1 is configured as a tripod or quadrapod. Nevertheless, any configuration of three or more legs could be employed. In this embodiment, the individual legs of the elevating structure 410 may be configured to telescope in length, thereby providing the user of the hunting blind a number of different optional heights.

Figure 5:
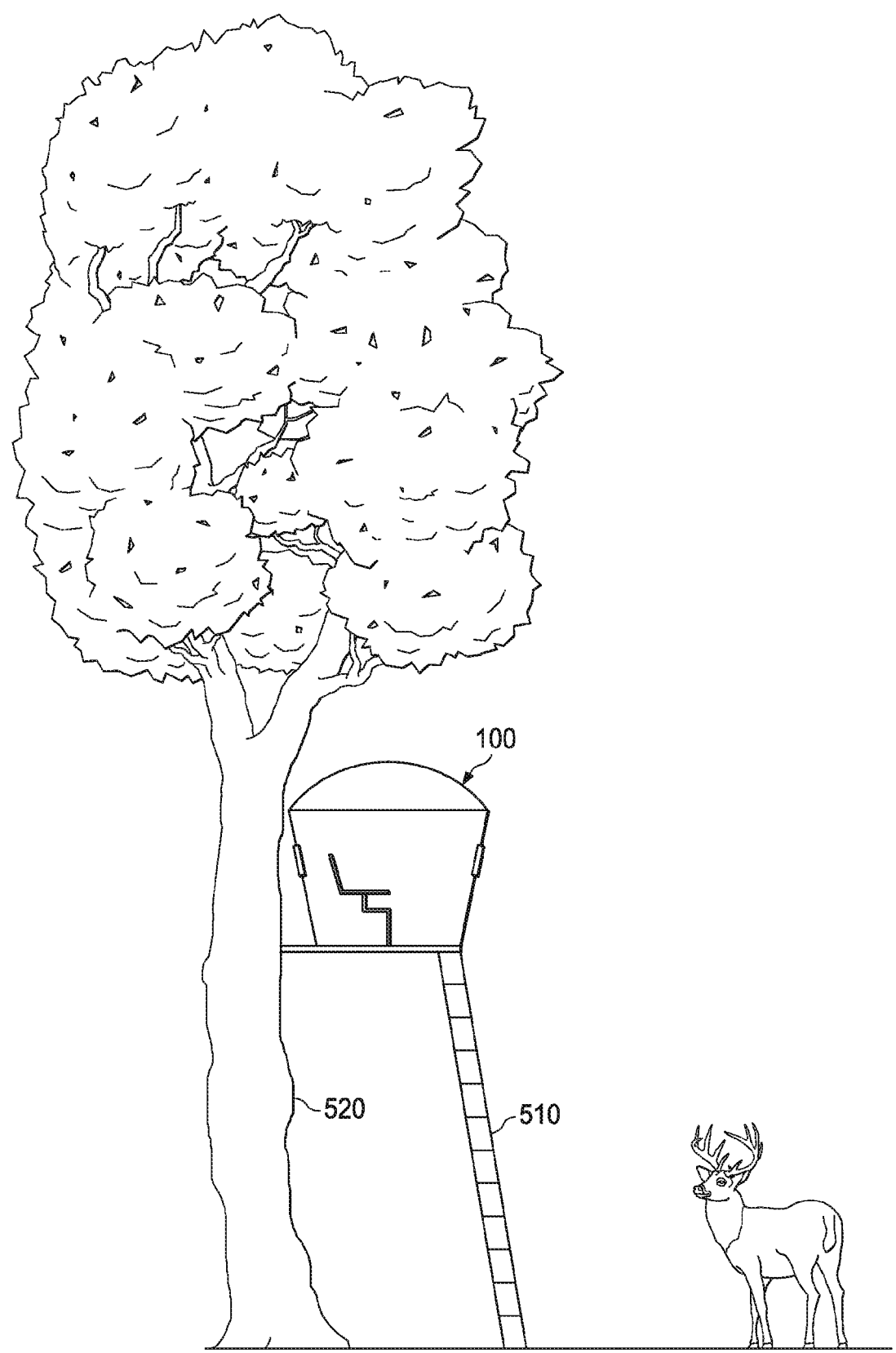
FIG. 5 illustrates an embodiment wherein the hunting blind is elevated using a ladder stand to elevate it above ground level.

Turning to FIG. 5, illustrated is an embodiment wherein the hunting blind 100 is elevated using a ladder stand 510. In this embodiment, the ladder stand is leaning against a tree or post 520. The leg or legs of the ladder stand 510, similar to the legs of the elevating structure 410, may telescope in length. Likewise, the ladder stand 510 is configured as an optional, and removable, feature.

Figure 6:
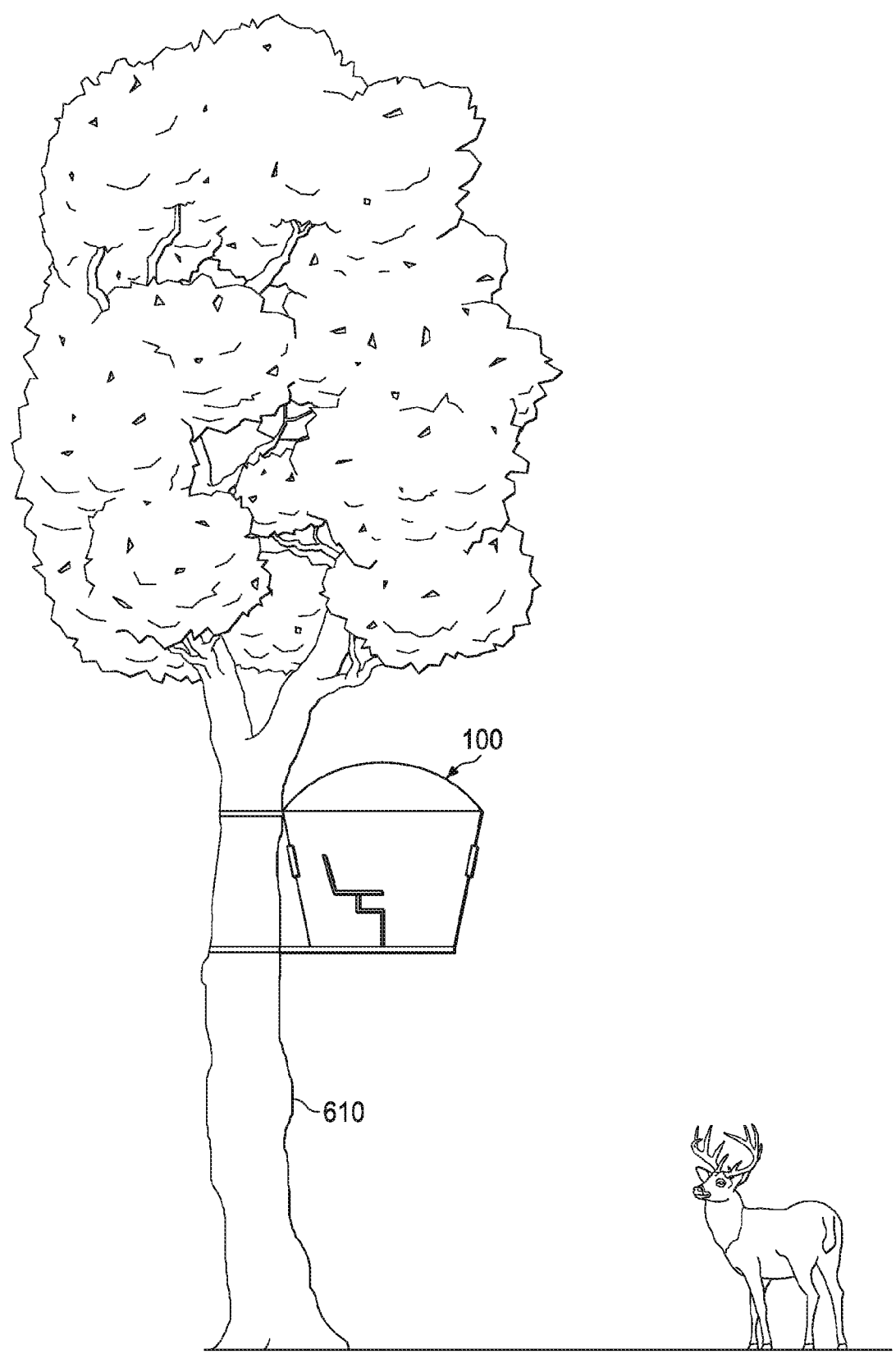
FIG. 6 illustrates an embodiment wherein the hunting blind is configured to couple directly to a tree or post.

Turning to FIG. 6, illustrated is an embodiment wherein the hunting blind 100 is configured to couple directly to a tree or post 610 (e.g., hang directly therefrom), and therefore elevate the hunting blind 100 above ground level without the use of an elevating structure. This is in direct contrast to the embodiments of FIGS. 4 and 5. The mechanism configured to attach the hunting blind 100 directly to the tree or post 610 may be rounded or v-shaped in nature, to better approximate the shape and circumference of the tree or post 610. Likewise, it may include optional leveling means, so as to allow the base structure 110 to be mounted in a horizontal configuration, even if the tree or post is leaning. Those skilled in the art understand the leveling means that could be used.

Figure 7:
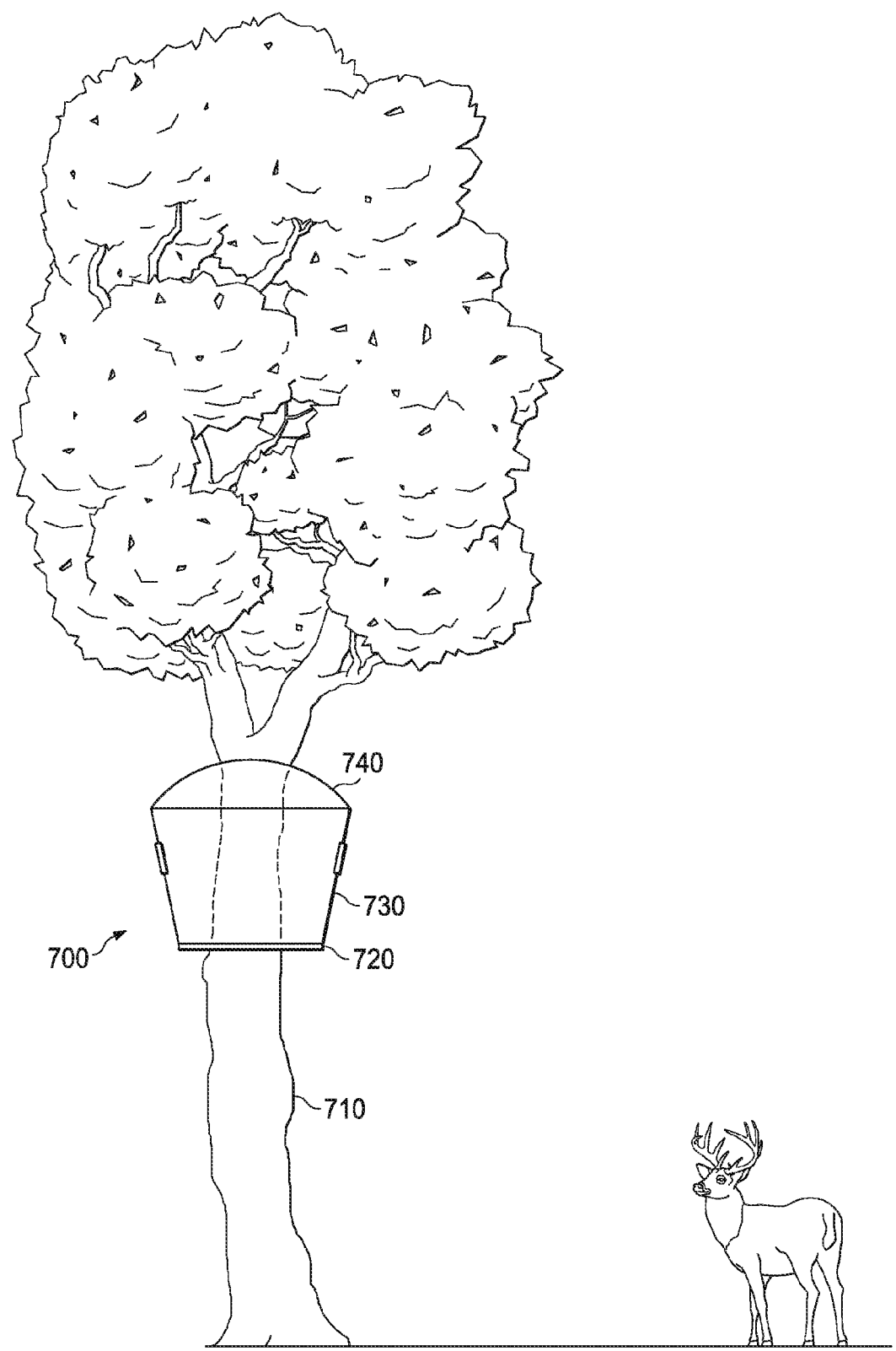
FIG. 7 illustrates an embodiment wherein the hunting blind substantially surrounds a tree or post.

Turning briefly to FIG. 7, illustrated is an embodiment wherein the hunting blind 700 substantially surrounds a tree or post 710. As discussed above, certain embodiments exist wherein a base structure 720 of the hunting blind 700 is a preexisting structure. In this embodiment, the one or more sidewall structures 730 and roof structure 740 would retrofit with the preexisting base structure 720. Accordingly, in one embodiment the one or more sidewall structures 730 and roof structure 740 would attach directly to the base structure 720 itself. However, in yet another embodiment the one or more sidewall structures 730 and roof structure 740 would attach to the tree or post 710, and in essence drape over the base structure 730. This type of embodiment is useful whether the hunting blind is configured to substantially surround the tree or post 710, or not. Likewise, this embodiment is useful whether the hunting blind is a ladder stand or independently hanging.

Although the present disclosure has been described in detail, those skilled in the art should understand that they can make various changes, substitutions and alterations herein without departing from the spirit and scope of the disclosure in its broadest form.

What is claimed is:

1. A hunting blind, comprising:
    a base comprised of a metal exterior with metal support crossbars configured to support the weight of a human and be elevated above ground level using three or more separate legs;
    one or more sidewalls coupleable to the base, at least one of the one or more sidewalls including a first rigid substantially vertical portion and a second rigid portion extending up and slanting outwardly from the first substantially vertical portion by at least about 10 degrees, the second rigid portion having a surface area;
    one or more fixed outwardly slanting windows located within the second rigid portion, the one or more outwardly slanting windows having a surface area less than 50 percent the surface area of the second rigid portion; and
    a rigid roof coupled to the second rigid portion.

2. The hunting blind as recited in claim 1 wherein the second rigid portion slants outwardly from the first rigid substantially vertical portion by at least about 30 degrees.

3. The hunting blind as recited in claim 1 wherein the second rigid portion slants outwardly from the first rigid substantially vertical portion by at least about 60 degrees.

4. The hunting blind as recited in claim 1 wherein the one or more sidewalls comprise metal.

5. The hunting blind as recited in claim 1 wherein the one or more sidewalls comprise a polymer.

6. The hunting blind as recited in claim 1 wherein the rigid roof comprises metal.

7. The hunting blind as recited in claim 1 wherein the rigid roof comprises a polymer.

8. The hunting blind as recited in claim 1 wherein one or more sidewalls and the rigid roof comprise a single integral unit.

9. The hunting blind as recited in claim 1 wherein the base, one or more sidewalls and rigid roof form an octagonal structure.

10. The hunting blind as recited in claim 1 wherein the base, one or more sidewalls and rigid roof form a pentagonal, hexagonal or heptagonal structure.

11. The hunting blind as recited in claim 1 wherein the first rigid substantially vertical portion and the second rigid portion are substantially similar in length.

12. The hunting blind as recited in claim 1 wherein the one or more windows are located substantially equal distance from a top of the second rigid portion and a bottom of the second rigid portion.

13. The hunting blind as recited in claim 1 wherein the one or more windows are located substantially in the middle of the second rigid portion.

14. The hunting blind as recited in claim 1, further including a ladder attached to the base.

* * * * *